US012755161B2

(12) United States Patent
Jayasingh et al.

(10) Patent No.: US 12,755,161 B2
(45) Date of Patent: Oct. 6, 2026

(54) MULTI-STATE DISTRIBUTED TRAINING DATA CREATION USING BYTE-BASED REPLICATION FOR AN ARTIFICIAL INTELLIGENCE PLATFORM

(71) Applicant: Bank of America Corporation, Charlotte, NC (US)

(72) Inventors: Magaranth Jayasingh, Chennai (IN); Vimal Chandroliya, Gujarat (IN)

(73) Assignee: Bank of America Corporation, Charlotte, NC (US)

( * ) Notice: Subject to any disclaimer, the term of this patent is extended or adjusted under 35 U.S.C. 154(b) by 491 days.

(21) Appl. No.: 18/388,450

(22) Filed: Nov. 9, 2023

(65) Prior Publication Data

US 2025/0156724 A1 May 15, 2025

(51) Int. Cl.
*G06N 20/00* (2019.01)
*G06N 3/098* (2023.01)

(52) U.S. Cl.
CPC .................................... *G06N 3/098* (2023.01)

(58) Field of Classification Search
CPC .......... G06N 3/098; G06N 3/045; G06N 3/08; G06N 20/00
See application file for complete search history.

(56) References Cited

U.S. PATENT DOCUMENTS 11,069,143 B2 7/2021 Kim et al.
11,138,731 B2 10/2021 Katzmann et al.
11,257,272 B2 2/2022 Rowell et al.
11,615,208 B2 3/2023 Truong et al.
12,242,928 B1 * 3/2025 Chen ........................ G06N 5/01
2021/0326765 A1 * 10/2021 Ukil ......................... G06N 5/01
2023/0315877 A1 * 10/2023 McMillon ........... G06F 21/6209 726/27
2025/0293943 A1 * 9/2025 Kela ....................... H04L 41/16
2025/0373506 A1 * 12/2025 Yue ........................ G06N 3/098

OTHER PUBLICATIONS

Hohman, Fred, et al. "Understanding and visualizing data iteration in machine learning." Proceedings of the 2020 CHI conference on human factors in computing systems. 2020 (Year: 2020).*

(Continued)

*Primary Examiner* — Andrew T McIntosh
(74) *Attorney, Agent, or Firm* — Banner & Witcoff, Ltd.

(57) ABSTRACT

Aspects of the disclosure relate to generating and replicating training data. A computing system may generate different versions of training data and corresponding different sequence numbers. A distributed machine learning model may be trained to generate different versions of the training data based on the corresponding different sequence numbers. The training data and identical copies of the distributed machine learning model may be sent to secondary computing devices. A second sequence number corresponding to a second version of the training data may be determined. The second sequence number may be sent to secondary computing devices. Based on inputting the second sequence number into the identical copy of the distributed machine learning model, copies of the second version of the training data may be generated in the secondary computing devices.

20 Claims, 8 Drawing Sheets

(56) References Cited

OTHER PUBLICATIONS

Li, Bo, et al. "Scalable iterative classification for sanitizing large-scale datasets." IEEE transactions on knowledge and data engineering 29.3 (2016): 698-711 (Year: 2016).*
Besnier et al., "This Dataset Does Not Exist: Training Models from Generated Images," arXiv:1911.02888v1 [cs.CV] Nov. 7, 2019, 6 pages.
Nashaat et al., "Asterisk: Generating Large Training Datasets with Automatic Active Supervision," ACM/IMS Trans. Data Sci. 1, 2, Article 13 (May 2020), 28 pages.
Tripathi et al., "Learning to Generate Synthetic Data via Compositing," proceedings of the IEEE/CVF Conference on Computer Vision and Pattern Recognition (CVPR), 2019, 10 pages.

* cited by examiner

500

| | 502 | 504 | 506 | 508 | 510 |
|---|---|---|---|---|---|
| | Account No. | Sequence No. | Balance | Name | Photographic Image |
| 512 | 1001 | 255 | $2008 | Wilfred Laurier | Image 255 |
| 514 | 1001 | 254 | $1414 | Wilfred L | Image 254 |
| 516 | 1001 | 253 | $205 | Monsieur Laurier | Image 253 |
| | 1001 | 252 | $1023 | Sir Wilfred Laurier | Image 252 |
| | 1001 | 251 | $15 | Mr. Laurier | Image 251 |

FIG. 5

MULTI-STATE DISTRIBUTED TRAINING DATA CREATION USING BYTE-BASED REPLICATION FOR AN ARTIFICIAL INTELLIGENCE PLATFORM

TECHNICAL FIELD

Some aspects of the disclosure relate to using machine learning models to automatically replicating training data that is used to train machine learning models at remote locations. In particular, some aspects of the disclosure pertain to distributing machine learning models to remote locations at which the machine learning models may replicate training data based on a received sequence number.

BACKGROUND

Training data is used in a variety of applications including training machine learning models to perform various tasks such as financial analysis and modelling. In order to train the machine learning models to perform different types of tasks, the machine learning models may use different types of training data. For example, machine learning models that are being trained to perform analysis of stock trades may require different types of training data from machine learning models that are being trained to authenticate users.

In some cases, for example to preserve the privacy of users or to test specific types of data that may not already exist, the training data may be artificially generated. The artificially generated training data may possess the characteristics of real-world data but may be used without the privacy issues that may affect real world data. However, the training datasets may be large in size and occupy a significant amount of storage which may take a significant amount of time to transmit from one location to another, especially when the locations are remote (e.g., in different countries) and the network connection speed results in lengthy data transmission times. As a result, attempting to distribute training data to remote locations may present challenges.

SUMMARY

Aspects of the disclosure provide technical solutions to improve the effectiveness with which training data is generated and replicated.

In accordance with one or more embodiments of the disclosure, a computing system for generating and replicating distributed training data. The computing system may comprise a data generation machine learning model configured to generate a plurality of different versions of training data and a corresponding plurality of different sequence numbers. The computing system may comprise a distributed machine learning model configured to generate the plurality of different versions of the training data based on the corresponding plurality of different sequence numbers. The computing system may comprise one or more secondary computing devices. Each of the one or more secondary computing devices may be configured to store an identical copy of the distributed machine learning model. The computing system may comprise one or more processors and memory storing computer-readable instructions that, when executed by the one or more processors, cause the computing system to generate, based on the inputting of the training data into the data generation machine learning model, the plurality of different versions of the training data and the corresponding plurality of different sequence numbers. The computing system may train, based on inputting the training data and the plurality of different versions of the training data into the distributed machine learning model, the distributed machine learning model to generate each of the plurality of different versions of the training data based on input of each of the corresponding plurality of different sequence numbers. The computing system may determine an estimated time to send the plurality of different versions of the training data to the one or more secondary computing devices. The computing system may, based on the estimated time meeting one or more criteria, send a first version of the plurality of different versions of the training data and a plurality of identical copies of the distributed machine learning model to the one or more secondary computing devices. The computing system may determine a second sequence number corresponding to a second version of the training data. The computing system may send the second sequence number to one or more secondary computing devices of the one or more secondary computing devices. The computing system may generate, in the one or more secondary computing devices, based on inputting the second sequence number into the identical copy of the distributed machine learning model in each of the one or more secondary computing devices, one or more copies of the second version of the training data.

In one or more implementations, the system may determine one or more differences between the second version of the training data and the one or more copies of the second version of the training data. Further, the system may generate, for the one or more copies of the second version of the training data in which the one or more differences exceed a similarity threshold, an indication that the one or more copies of the second version of the training data may be inaccurate. Further, the system may retrain the distributed machine learning model. The system may replace the one or more identical copies of the distributed machine learning model that was previously trained with one or more identical copies of the distributed machine learning model that was retrained.

In one or more implementations, the one or more differences comprise a difference between a size of the second version and a size of the one or more copies of the second version, a difference between types of datapoints in the second version and the types of the datapoints in the one or more copies of the second version, or a difference in a number of the datapoints in the second version and the number of the datapoints in the one or more copies of the second version.

In one or more implementations, the memory stores computer-readable instructions that, when executed by the one or more processors, cause the computing system to generate a primary hash value based on the second version of the training data. The computing system may generate one or more secondary hash values based on the one or more copies of the second version of the training data. The computing system may determine whether the one or more secondary hash values match the primary hash value. Further, the computing system may generate, for each of the one or more copies of the second version of the training data that correspond to the one or more secondary hash values that do not match the primary hash value, an indication that the one or more copies of the second version of the training data may be inaccurate.

In one or more implementations, the memory stores computer-readable instructions to train the distributed machine learning model, that when executed by the one or more processors, cause the computing system to generate, based on inputting the plurality of different sequence numbers into the distributed machine learning model, a plurality of predicted versions of the training data. The computing system may determine a similarity between the plurality of predicted versions of the training data and the plurality of different versions of the training data. The computing system may generate, based on the similarity between the plurality of predicted versions of the training data and the plurality of different versions of the training data, a training data prediction accuracy of the distributed machine learning model. Further, the computing system may adjust a weighting of one or more training data prediction parameters of the distributed machine learning model based on the training data prediction accuracy. The weighting of the training data prediction parameters that increase the training data prediction accuracy may be increased. The weighting of the training data prediction parameters that decrease the training data prediction accuracy may be decreased.

In one or more implementations, the training data prediction accuracy may be based on an amount of similarity between the plurality of predicted versions of the training data and the plurality of different versions corresponding to the plurality of different sequence numbers used to generate the plurality of predicted versions.

In one or more implementations, the plurality of different versions of the training data may comprise a plurality of images. The plurality of predicted versions of the training data may comprise a plurality of predicted images. The similarity between the plurality of predicted versions of the training data and the plurality of different versions of the training data may be based on a number of visual features of the plurality of images that match the visual features of the plurality of predicted images.

In one or more implementations, the plurality of different versions of the training data may comprise a plurality of text segments. The plurality of predicted versions of the training data may comprise a plurality of predicted text segments. The similarity between the plurality of predicted versions of the training data and the plurality of different versions of the training data may be based on a number of the plurality of text segments that match the plurality of predicted text segments.

In one or more implementations, the plurality of different versions of the training data may comprise a plurality of numerical datapoints. The plurality of predicted versions of the training data may comprise a plurality of predicted numerical datapoints. Further, the similarity between the plurality of predicted versions of the training data and the plurality of different versions of the training data may be based on a number of the plurality of numerical datapoints that match the plurality of predicted numerical datapoints.

In one or more implementations, the corresponding plurality of sequence numbers may have a length of one byte.

In one or more implementations, the one or more secondary computing devices may be physically remote from the computing device that generates the first version of the training data.

In one or more implementations, meeting the one or more criteria may comprise the estimated time to send the first version of the training data to the one or more secondary computing devices exceeding a time for the one or more secondary computing devices to generate the first version of the training data.

In one or more implementations, the distributed machine learning model may comprise a generative adversarial network (GAN).

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an illustrative example of training data in accordance with one or more aspects of the disclosure;

DETAILED DESCRIPTION

Figure 1:
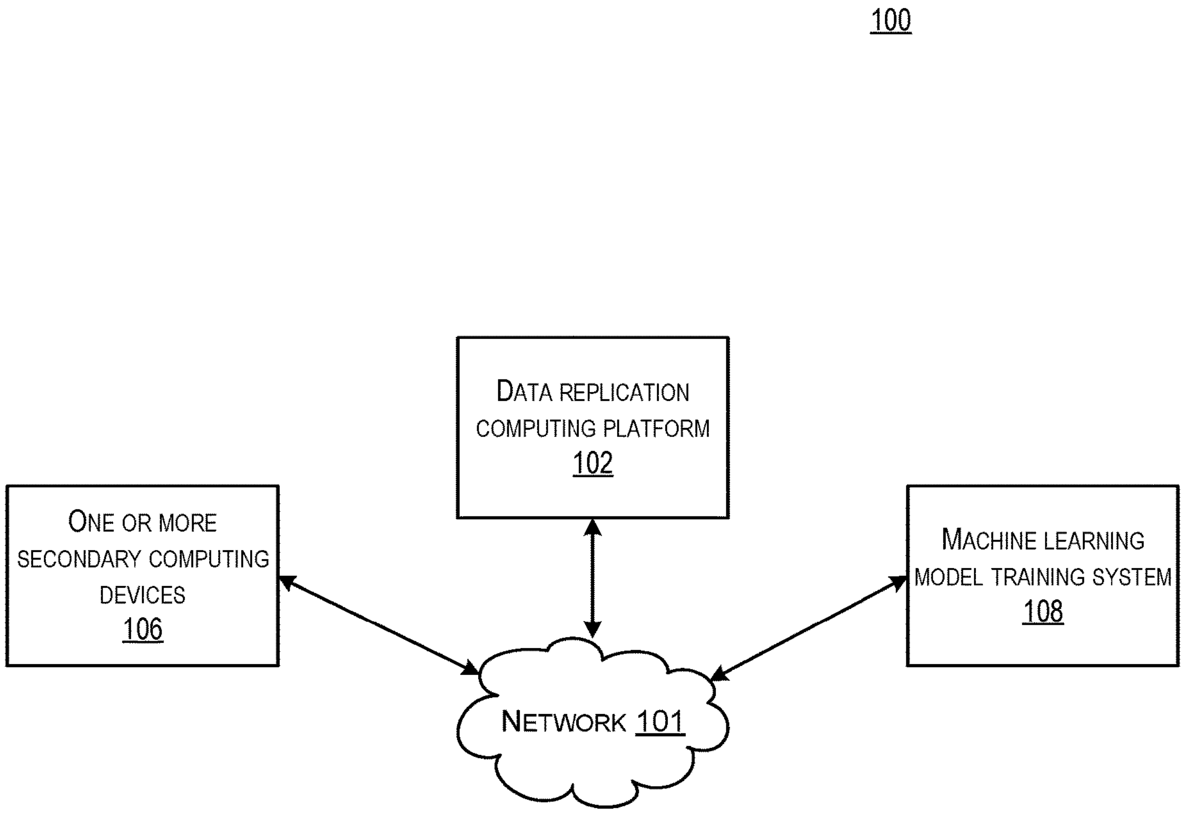
FIG. 1 depicts an illustrative computing environment for automated replication of distributed training data in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for generating training data, replicating training data, and/or maintaining the consistency of training data across multiple computing devices (e.g., computing devices located at disparate data centers) that may be connected via a network. The disclosed technology may leverage the use of machine learning models (e.g., generative adversarial networks (GANs)) to generate and distribute different versions of training data that are respectively associated with unique sequence numbers. Further, the disclosed technology may send, to computing devices located at different data centers, the training data and identical copies of the machine learning model that generated the different versions of the training data. When a different version of the training data is used at one computing device, the sequence number associated with that version of the training data may then be sent to other data centers and the identical copy of the machine learning model at each data center may be used to generate the same version of the training data at each of the different data centers without having to transmit the training data in its entirety. As a result, the use of these techniques may result in a variety of benefits and advantages including more efficient usage of network resources, more efficient use of storage resources, more effective use of computational resources, and/or more consistent training data across computing devices at different data centers.

Training data may be used for a variety of purposes. For example, training data may be used to test the effectiveness of various applications including simulations and/or models that require complex and/or unique data. To reduce expenses and maintain the confidentiality of consumer records, the applications may be trained using artificially generated data (e.g., artificially generated customer data) in lieu of real-world data based on actual people and/or events. When training data is used at different locations, maintaining the consistency of the training data across the different locations may have a significant impact on the usefulness of the training data. For example, the performance of different applications may be properly evaluated when the training data used to evaluate the different applications is the same across the different computing devices that use the training data, thereby ensuring that differences in application performance are not due to differences in training data. However, training data may be large and occupy a significant amount of storage space. Further, sending complete copies of training data to different locations (e.g., locations that are far apart) every time a different version of the training data is generated may result in a variety of costs including significant use of time, network resources (e.g., usage of network resources to transfer large amounts of data), and/or financial expenses. The disclosed technology may overcome these and other issues by leveraging a novel machine learning model and distribution techniques to generate and update training data at disparate locations.

For example, a computing system (e.g., a data replication platform) for the generation and replication of a training dataset may comprise a data generation machine learning model that is configured to generate a plurality of versions of training data and a corresponding plurality of sequence numbers. Further, the computing system may comprise one or more distributed machine learning models that may comprise a generative adversarial network (GAN) that is configured to generate the plurality of versions of training data based on the corresponding plurality of sequence numbers. Further, the computing system may comprise a plurality of computing devices, each of which may be configured to store an identical copy of the one or more distributed machine learning models. The identical copies of the one or more distributed machine learning models may generate identical output (e.g., training data) when the same input (e.g., the same sequence number) is provided as input.

Further, the computing system may generate, based on the inputting of the training data into the data generation machine learning model, the plurality of versions of the training data and the corresponding plurality of sequence numbers. The computing system may train, based on inputting the training data and the plurality of different versions of the training data into the one or more distributed machine learning models, cause the one or more distributed machine learning models to generate each of the plurality of versions of the training data based on input of each of the corresponding plurality of sequence numbers. Further, the computing system may send a first version of the training data and a plurality of identical copies of the one or more distributed machine learning models to the plurality of computing devices. The computing system may generate a second version of the plurality of versions of the training data.

The computing system may then determine a second sequence number corresponding to a second version of the plurality of different versions of the training data. Further, the computing system may send the second sequence number to other computing devices (e.g., secondary computing devices) of the plurality of computing devices. Each of the other computing devices may then generate, based on inputting the sequence number into the identical copies of the one or more distributed machine learning models in each of the other computing devices (e.g., each of the secondary computing devices), the second version of the plurality of different versions of the training data that was generated by the computing system.

FIG. 1 depicts an illustrative computing environment for automated replication of training data in accordance with one or more aspects of the disclosure. Referring to FIG. 1, computing environment 100 may include one or more computing systems. For example, computing environment 100 may include a data replication computing platform 102, one or more secondary computing devices 106, and/or machine learning model training system 108.

As described further below, data replication computing platform 102 may comprise a computing system that includes one or more computing devices (e.g., computing devices comprising one or more processors, one or more memory devices, one or more storage devices, and/or communication interfaces) that may be used to generate training data and generate a plurality of different versions of the training data based on corresponding different sequence numbers. For example, the data replication computing platform 102 may be configured to implement one or more machine learning models that may be configured and/or trained to generate training data and a plurality of different versions of the training data and/or corresponding different sequence numbers.

In some implementations, the data replication computing platform 102 may send data (e.g., a first version and/or a second version of the plurality of different versions of the training data and/or one or more distributed machine learning models) to the one or more secondary computing devices 106. The one or more secondary computing devices 106 may be configured to grant access to the data replication computing platform 102. For example, authorization to send training data, one or more distributed machine learning models, and/or a plurality of sequence numbers from the data replication computing platform 102 to the one or more secondary computing devices 106 may be restricted to an authorized user of the data replication computing platform 102 (e.g., an administrator with permission to send training data and/or one or more distributed machine learning models to the one or more secondary computing devices 106).

Communication between the data replication computing platform 102, one or more secondary computing devices 106, and/or the machine learning model training system 108 may be encrypted. In some embodiments, the data replication computing platform 102 may access one or more computing devices and/or computing systems remotely. For example, the data replication computing platform 102 may remotely access the one or more secondary computing devices 106 and/or the machine learning model training system 108.

The data replication computing platform 102 may be located at a different physical location than the one or more secondary computing devices 106. Although a single instance of the data replication computing platform 102 is shown, this is for illustrative purposes only, and any number of data replication computing platform 102 may be included in the computing environment 100 without departing from the scope of the disclosure.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDS, and/or RAM), and/or a communication interface that may be used to send and/or receive data and/or perform operations including generating a plurality of different versions of training data and corresponding different sequence numbers and/or determining whether to send the plurality of different versions of training data to the one or more secondary computing devices 106.

In some implementations, one or more secondary computing devices 106 may include copies of the training data. Further, one or more secondary computing devices 106 may include identical copies of one or more distributed machine learning models.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising a plurality of different versions of the training data and/or a corresponding plurality of sequence numbers. One or more machine learning models stored and/or trained on the machine learning model training system 108 may include the one or more machine learning models on the data replication computing platform 102. Further, the one or more machine learning models of the data replication computing platform 102 may be trained and/or updated by the machine learning model training system 108.

Computing environment 100 may include one or more networks, which may interconnect the data replication computing platform 102 one or more secondary computing devices 106, and/or machine learning model training system 108. For example, computing environment 100 may include a network 101 which may interconnect, e.g., data replication computing platform 102, one or more secondary computing devices 106, and/or machine learning model training system 108. In some instances, the network 101 may be a 5G data network, and/or other data network.

Figure 2:
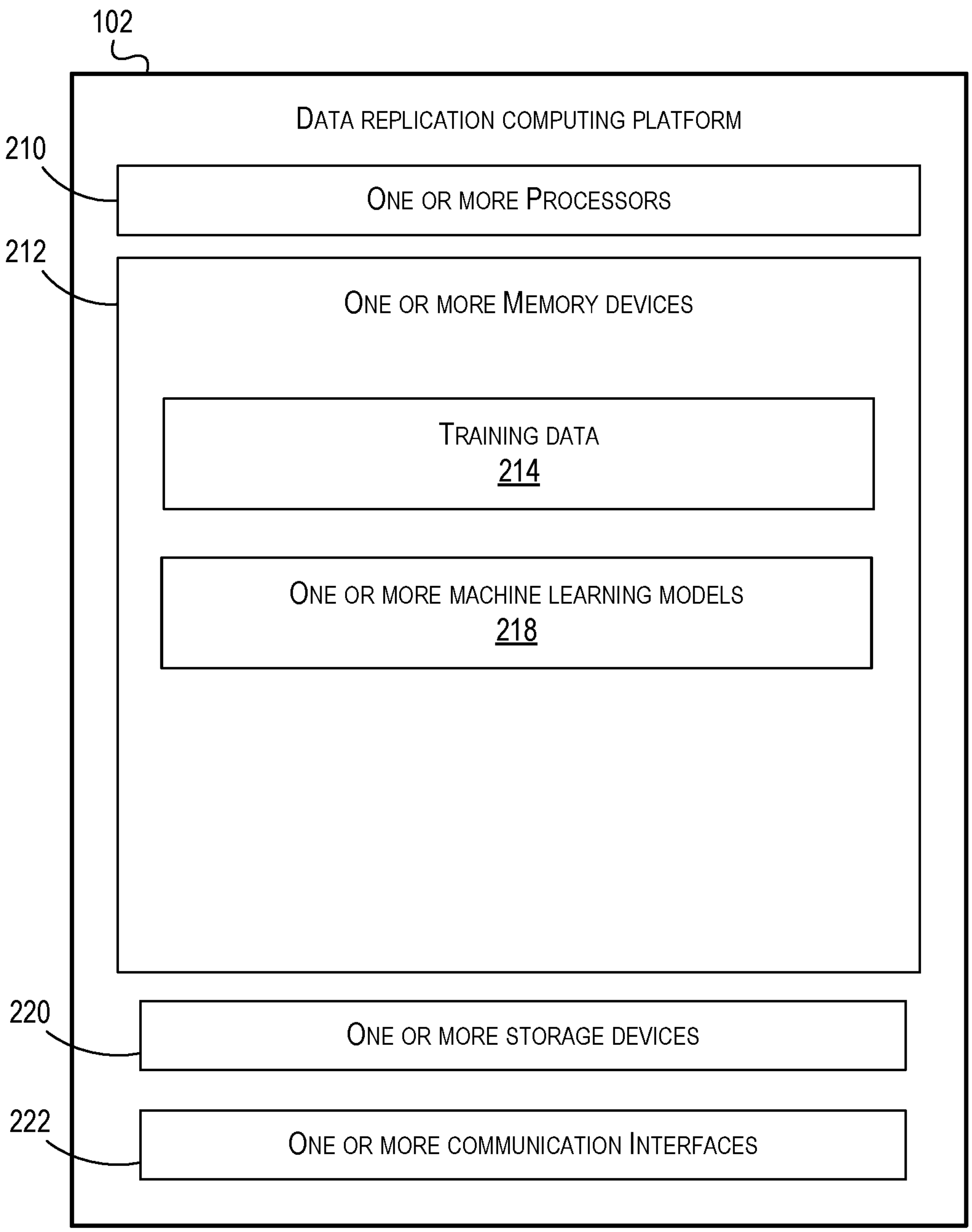
FIG. 2 depicts an illustrative computing system for automated generation and replication of distributed training data in accordance with one or more aspects of the disclosure.

In one or more arrangements, data replication computing platform 102, one or more secondary computing devices 106, and/or machine learning model training system 108 may comprise one or more computing devices capable of sending and/or receiving data (e.g., training data) and processing the data accordingly. For example, data replication computing platform 102, one or more secondary computing devices 106, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. Further, any combination of data replication computing platform 102, one or more secondary computing devices 106, and/or machine learning model training system 108 may, in some instances, be special-purpose computing devices configured to perform specific functions. For example, data replication computing platform 102 may comprise one or more application specific integrated circuits (ASICs) that are configured to process training data, implement one or more machine learning models, send different versions of training data, and/or send identical copies of one or more distributed machine learning models FIG. 2 depicts an illustrative computing system for automated generation and replication of training data in accordance with one or more aspects of the disclosure. Data replication computing platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between data replication computing platform 102 and one or more networks (e.g., network 101, or the like). One or more communication interfaces 222 may be communicatively coupled to the one or more processor 210. The memory may include one or more program modules having instructions that when executed by one or more processor 210 may cause the data replication computing platform 102 to perform one or more functions described herein and/or access data that may store and/or otherwise maintain information which may be used by such program modules and/or one or more processors 210.

The one or more memory devices 212 may comprise RAM. In some instances, the one or more program modules and/or databases may be stored by and/or maintained in different memory units of data replication computing platform 102 and/or by different computing devices that may form and/or otherwise make up data replication computing platform 102. For example, the memory may have, host, store, and/or include training data 214, and/or one or more machine learning models 218. One or more storage devices 220 (e.g., solid state drives and/or hard disk drives) may also be used to store data including the training data 214. The one or more storage devices 220 may comprise non-transitory computer readable media that may store data when the one or more storage devices 220 are in an active state (e.g., powered on) or an inactive state (e.g., sleeping or powered off).

Training data 214 may comprise data that may be used to train various computing systems. The training data 214 may comprise a plurality of fields. The plurality of fields may comprise a corresponding plurality of values.

Training data 216 may comprise a plurality of different versions of training data that may be inputted into the one or more machine learning models 218. Training data 216 may be used to train one or more machine learning models (e.g., machine learning models 218) which may generate predicted versions of training data based on input comprising a single version of training data and a sequence number. Further, training data 216 may be modified (e.g., some training data may be added, deleted, and/or changed) over time. For example, new training data may be used to update the training data 216. Further, the training data may be periodically updated after new versions of the training data 216 are generated.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate training data 214. Further, the one or more machine learning models 218 may generate output including a plurality of different versions of training data and a corresponding plurality of sequence numbers. Further, one or more machine learning models 218 may comprise one or more instructions that direct and/or cause the data replication computing platform 102 to access the training data 214 and/or perform other functions.

Figure 3:
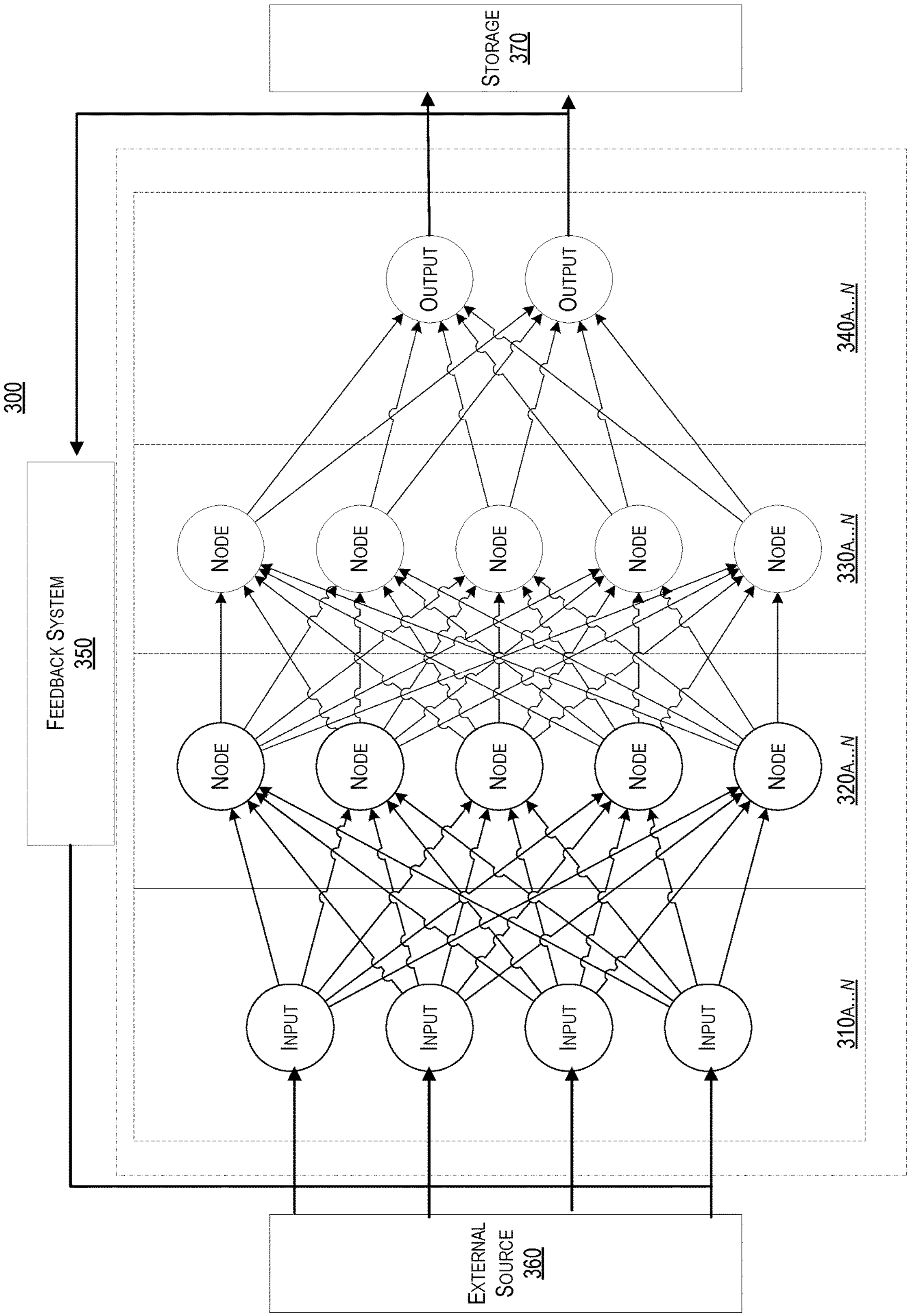
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include regression output, confidence values, and/or classification output. For example, the output may include a plurality of different versions of training data and a corresponding plurality of different sequence numbers. The system may use any machine learning model including one or more generative pretrained transformers (GPTs), generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize accuracy. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310*a-n* may be processed through processing nodes, such as the first set of processing nodes 320*a-n* and the second set of processing nodes 330*a-n*. The processing may result in output in output nodes 340*a-n*. As depicted by the connections from the first set of processing nodes 320*a-n* and the second set of processing nodes 330*a-n*, processing may comprise multiple steps or sequences. For example, the first set of processing nodes 320*a-n* may be a rough data filter, whereas the second set of processing nodes 330*a-n* may be a more detailed data filter.

The artificial neural network 300 may be configured to effectuate decision-making. As a simplified example for the purposes of explanation, the artificial neural network 300 may be configured to generate data (e.g., a plurality of different versions of training data and/or a corresponding plurality of different sequence numbers) and/or instructions (e.g., instructions to generate different versions of training data). The input nodes 310*a-n* may be provided with training data. The first set of processing nodes 320*a-n* may be each configured to perform specific steps to generate a plurality of different versions of training data and a corresponding plurality of sequence numbers. The second set of processing nodes 330*a-n* may be each configured to train one or more distributed machine learning models and/or generate a plurality of copies of the training data. Multiple subsequent sets may further refine this processing, each looking for further more specific tasks, with each node performing some form of processing which need not necessarily operate in the furtherance of that task. The artificial neural network 300 may then execute or cause to be executed operations that generate different versions of training data.

The feedback system 350 may be configured to determine the accuracy of the artificial neural network 300. Feedback may comprise an indication of similarity between the value of an output generated by the artificial neural network 300 and a ground-truth value. For example, in the generation of different versions of training data example provided above, the feedback system 350 may be configured generate different versions of training data based on input of corresponding sequence numbers.

The feedback system 350 may already have access to the ground-truth data (e.g., a different version of training data and a corresponding different sequence number), such that the feedback system may train the artificial neural network 300 by indicating the accuracy of the output generated by the artificial neural network 300. The feedback system 350 may comprise human input, such as an administrator indicating to the artificial neural network 300 whether it made a correct decision. The feedback system may provide feedback (e.g., an indication of whether the previous output was correct or incorrect and/or an extent to which a predicted version of training data is similar to ground-truth training data) to the artificial neural network 300 via input nodes 310*a-n* or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and/or validate different versions of training data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process training data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning. In some implementations, the artificial neural network 300 may receive input including one or more input features. The one or more input features may comprise information associated with training data.

Figure 4:
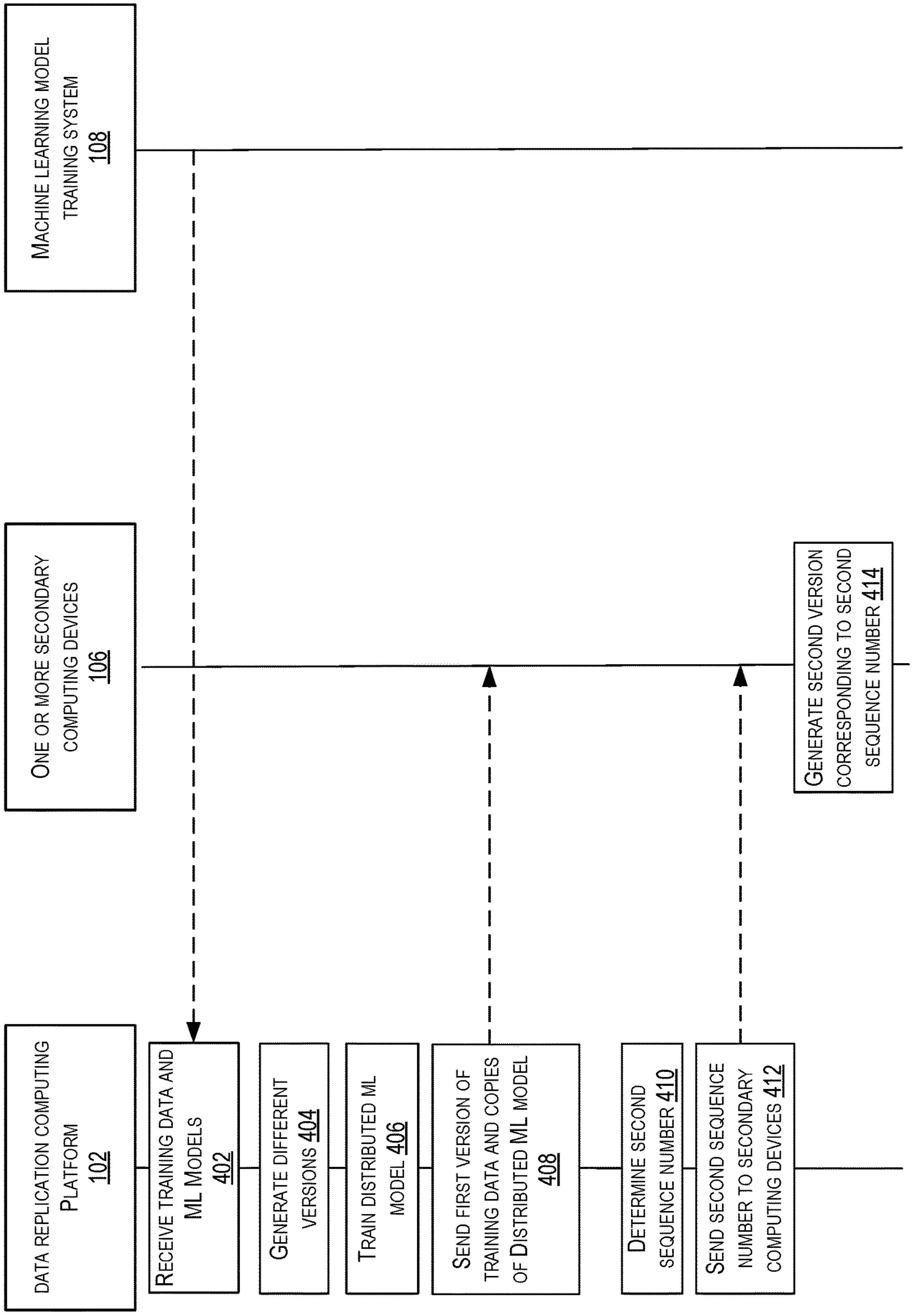
FIG. 4 depicts an illustrative event sequence for automated replication of distributed training data in accordance with one or more aspects of the disclosure.

FIG. 4 depicts an illustrative event sequence for automated replication of training data in accordance with one or more aspects of the disclosure. Referring to FIG. 4, at step 402, a machine learning model training system 108 may train one or more machine learning models (e.g., one or more data generation machine learning models and/or one or more distributed machine learning models) to generate different versions of training data and/or corresponding different sequence numbers. The machine learning model training system 108 may then send the one or more trained machine learning models to data replication computing platform 102 which may implement the one or more trained machine learning models (e.g., implement the one or more data generation machine learning models and/or one or more distributed machine learning models).

In some embodiments, data replication computing platform 102 may periodically establish a data connection with the machine learning model training system 108 in order to receive up to date copies of one or more machine learning models (e.g., the one or more machine learning models 218 described with respect to FIG. 2 and/or the artificial neural network 300 that is described with respect to FIG. 3) as described herein. In some instances, the machine learning model training system 108 may determine whether the data replication computing platform 102 has an updated copy of the one or more machine learning models and may send an indication to the data replication computing platform 102 if an update is not required at that time.

At step 404, the data replication computing platform 102 may generate a plurality of different versions of training data and/or a plurality of corresponding different sequence numbers. For example, the data replication computing platform 102 may input the training data into the one or more machine learning models (e.g., one or more data generation machine learning models), which may generate a plurality of different versions of training data and/or a plurality of corresponding different sequence numbers as described herein.

At step 406, the data replication computing platform 102 may train the one or more machine learning models (e.g., one or more distributed machine learning models). Training the one or more machine learning models may be performed iteratively and may comprise training the one or more machine learning models to generate a plurality of different versions of training data based on input comprising a single version of the training data and one or more different sequence numbers.

At step 408, the data replication computing platform 102 may send one or more identical copies of the one or more distributed machine learning models and a first version of the plurality of different versions of the training data to one or more secondary computing devices 106. Sending the one or more identical copies of the one or more distributed machine learning models and a first version of the training data may be based on a determination of whether an estimated time to send the plurality of different versions of the training data to the one or more secondary computing devices is greater than a time to generate a plurality of copies of the training data at the one or more secondary computing devices. If the estimated time to send the plurality of copies of the training data is greater than the time to generate the plurality of copies of the training data, then the one or more identical copies of the one or more distributed machine learning models and a first version of the training data may be sent to the one or more secondary computing devices 106.

At step 410, the data replication computing platform 102 may determine a second sequence number that corresponds to a second version of the plurality of different versions of the training data. For example, the data replication computing platform 102 may analyze the plurality of different versions and determine that the second version of the training data that was generated is the second version.

At step 412, the data replication computing platform 102 may send a second sequence number to the one or more secondary computing devices 106. The sequence number corresponding to the second version of the training data may be used as an input to the one or more machine learning models implemented on the one or more secondary computing devices 106.

At step 414, the data replication computing platform 102 may generate one or more copies of the second version of the training data in the one or more secondary computing devices 106. Each of the one or more secondary computing devices 106 may comprise at least one of the one or more copies of the second version of the training data.

FIG. 5 depicts an illustrative example of training data in accordance with one or more aspects of the disclosure. The training data may be processed by a computing device or computing system (e.g., the data replication computing platform 102) in accordance with the computing devices and/or computing systems described herein.

The training data 500 may be used to test and/or train applications. For example, the training data 500 may be used to train machine learning models, stress test software applications, and/or be used to perform simulations. The plurality of different versions of the training data 500 may correspond to the rows of the training data 500 and each of the rows of training data 500 may comprise a plurality of fields comprising a corresponding plurality of values. For example, training data 500 may comprise a plurality of account number fields 502, a plurality of sequence number fields 504, a plurality of balance fields 506, a plurality of name fields 508, and a plurality of photographic image fields 510.

A set of different fields in the same row of the training data 500 may correspond to a different version of training data 500. Further, the training data 500 may comprise a plurality of different versions. Each of the plurality of different versions of the training data may comprise fields with different values that are different from the values of the other plurality of different versions of the training data. For example, a row of training data 500 may comprise a different version 514 that may correspond to a sequence number field with a value of "254." The remaining fields of different version 514 may comprise an account number field with a value of "1001," a balance field with a value of "$1414," a name field with a value of "Wilfred L," and a photographic image field with a value of "Image 254." Further, a different row of training data 500 may comprise a different version 512 that may correspond to a sequence number field with a value of "255." The remaining fields of different version 512 may comprise an account number field with a value of "1001," a balance field with a value of "$2008," a name field with a value of "Wilfred Laurier," and a photographic image field with a value of "Image 255."

The different versions of training data 500 may be generated by a data generation machine learning model. Further, the training data 500 may be used to train one or more distributed machine learning models to generate different versions of the training data 500 based on input comprising a sequence number and a single version of the training data 500 (e.g., different version 512). For example, a computing device may receive the different version 512 and sequence number "253." The different version 512 and sequence number "253" may be input into one or more distributed machine learning models that is implemented on the computing device and may generate the different version 516 that corresponds to different version 516.

Figure 6:
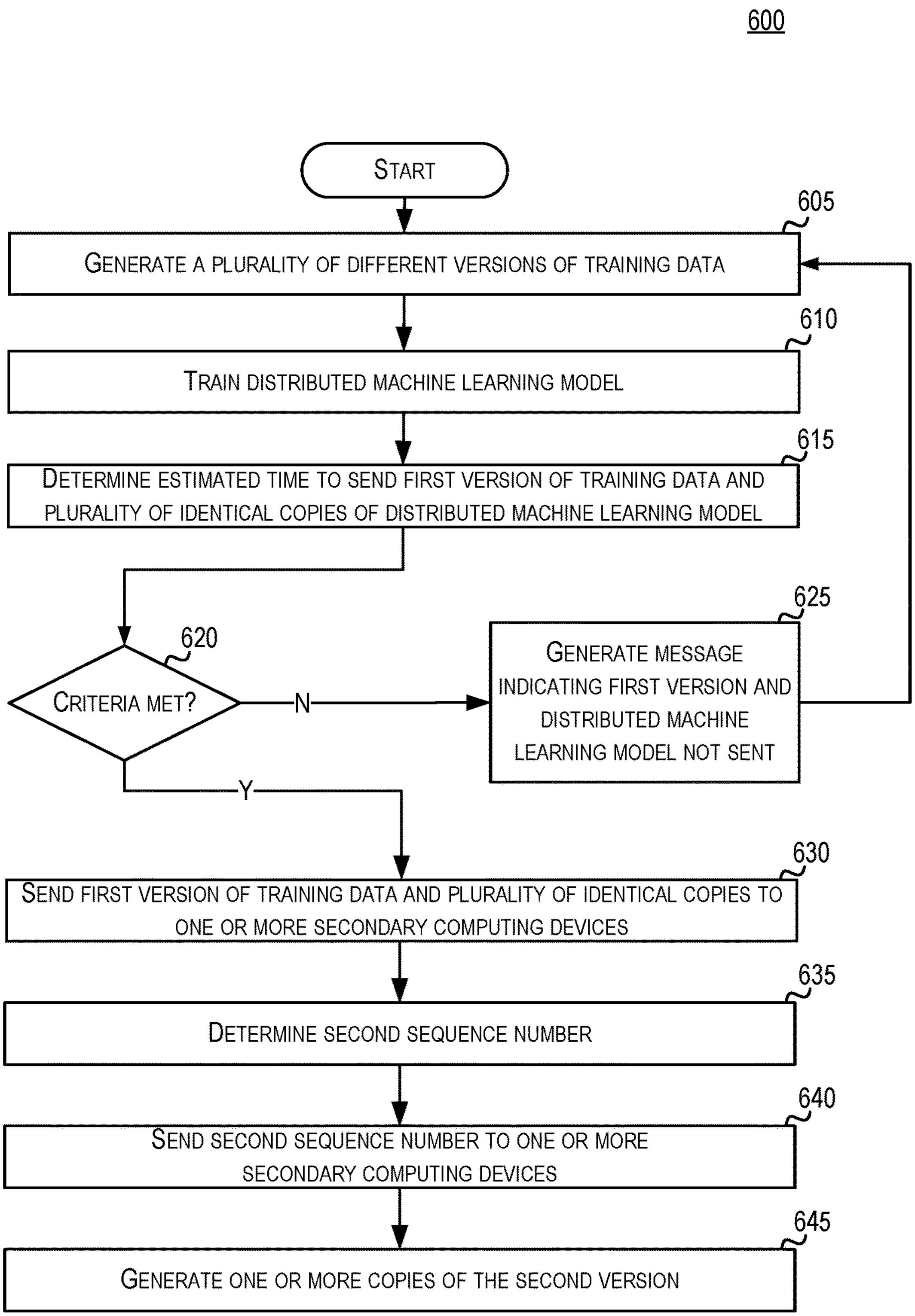
FIG. 6 depicts an illustrative method for automatically generating and replicating distributed training data in accordance with one or more aspects of the disclosure.

FIG. 6 depicts an illustrative method for automatically generating and replicating distributed training data in accordance with one or more aspects of the disclosure. The steps of a method 600 for automatically generating and replicating distributed training data may be implemented by a computing device or computing system (e.g., the data replication computing platform 102) in accordance with the computing devices and/or computing systems described herein. One or more of the steps described with respect to FIG. 6 may be omitted, performed in a different order, and/or modified. Further, one or more other steps (e.g., the steps described with respect to FIG. 6) may be added to the steps described with respect to FIGS. 7 and/or 8.

At step 605, a computing system may generate, based on inputting of training data into a data generation machine learning model, a plurality of different versions of the training data and/or a corresponding plurality of different sequence numbers. The training data may be similar to the training data described herein (e.g., the training data 500 that is described with respect to FIG. 5) and may comprise training data used to test various systems and/or applications comprising machine learning models and/or simulations. Further, the training data may be retrieved from local storage or from a remote computing system. For example, the data replication computing platform 102 may input the training data 214 into one or more machine learning models 218, which may be configured and/or trained to generate the plurality of different versions of training data and a corresponding plurality of sequence numbers. The plurality of different versions of the training data may comprise a plurality of images (e.g., digital photographs), a plurality of text segments (e.g., personal names, organization names, and/or descriptions of events), and/or a plurality of numerical datapoints (e.g., dollar amounts, dates, times of day, and/or sequence numbers). The plurality of corresponding sequence numbers may be unique and correspond to the number of the plurality of different versions of the training data. For example, if three hundred different versions of the training data were generated, the plurality of corresponding sequence numbers may range from one to three-hundred, with each different version corresponding to a unique sequence number between one and three-hundred. By way of further example, the plurality of corresponding sequence numbers may have a length of one byte (e.g., 8 bits), which may be correspond to up to two-hundred and fifty-six different versions of the training data.

Generating the plurality of different versions of training data may comprise determining that each of the plurality of different versions of the training data is different from every other one of the plurality of different versions of the training data. Further, the computing system may determine that each of the plurality of different versions of the training data may comprise at least a threshold number of differences with the other different versions of the training data. For example, the one or more machine learning models 218 may generate hundreds of different combinations of the plurality of different versions of training data which may comprise different compositions of different versions of training data.

At step 610, a computing system may train, based on inputting the training data and the plurality of different versions of the training data into one or more distributed machine learning models, the one or more distributed machine learning models to generate each of the plurality of different versions of the training data based on input of each of the corresponding plurality of different sequence numbers. Training the one or more distributed machine learning models is described with respect to FIG. 7 in the method 700. The one or more distributed machine learning models may comprise a generative adversarial network (GAN).

At step 615, the computing system may determine an estimated time to send the plurality of different versions of the training data to one or more secondary computing devices. The one or more secondary computing devices may be physically remote from the computing device that initially generates the plurality of different versions of the training data. For example, the data replication computing platform 102 may analyze the plurality of different versions of training data and determine a size (e.g., a size in megabytes) of the plurality of different versions of training data. The data replication computing platform 102 may then determine a network throughput and determine an estimated time to send the plurality of different versions of training data to the one or more secondary computing devices.

At step 620, the computing system may, based on the estimated time meeting one or more criteria, perform step 630 and send a first version of the plurality of different versions of the training data and/or a plurality of identical copies of the one or more distributed machine learning models to one or more secondary computing devices. For example, the one or more criteria may comprise an estimated time threshold that is used to determine whether to send the training data and a plurality of identical copies of the one or more distributed machine learning models. Further, a computing system (e.g., the data replication computing platform 102) may compare a time to generate the plurality of different versions of the training data to the estimated time to send the first version of the training data and the plurality of identical copies of the one or more distributed machine learning models to one or more secondary computing devices. Based on the estimated time being longer in duration than the time to generate the plurality of different versions of the training data, the data replication computing platform 102 may send the first version of the training data and/or the plurality of identical copies of the one or more distributed machine learning models the one or more secondary computing devices.

Based on the estimated time not meeting the one or more criteria, the computing system may perform step 630 and generate an indication that the first version of the training data and the one or more distributed machine learning models may not be sent to the one or more secondary computing devices. For example, a computing system (e.g., the data replication computing platform 102) may compare a time to generate the plurality of different versions of the training data to the estimated time to send the first version of the training data and the one or more distributed machine learning models to one or more secondary computing devices. Based on the estimated time being shorter in duration than the time to generate the plurality of different versions of the training data, the data replication computing platform 102 may not send the first version of the training data and the plurality of identical copies of the one or more distributed machine learning models to the one or more secondary computing devices and may instead generate an indication that the training data and the one or more distributed machine learning models may not be sent to the one or more secondary computing devices.

At step 625, a computing system may generate one or more indications (e.g., a message) that the one or more criteria were not met. For example, the data replication computing platform 102 may generate a message indicating "THE DISTRIBUTED MACHINE LEARNING MODELS AND A FIRST VERSION OF THE TRAINING DATA HAVE NOT BEEN SENT" that may be displayed on a display device of the data replication computing platform 102. In some embodiments, the computing system may perform step 605 after completing step 625.

At step 630, a computing system may send a first version of the plurality of different versions of the training data and/or a plurality of identical copies of the one or more distributed machine learning models to the one or more secondary computing devices. For example, the data replication computing platform 102 may send a first version of the plurality of different versions of the training data and/or a plurality of identical copies of the one or more distributed machine learning models to the one or more secondary computing devices 106.

At step 635, a computing system may determine a second sequence number corresponding to a second version of the plurality of different versions of the training data. For example, the data replication computing platform 102 may analyze the plurality of different versions of the training data and determine that the second different version of the training data that was generated is the second version.

At step 640, a computing system may send the second sequence number to one or more secondary computing devices. For example, the data replication computing platform 102 may send the second sequence number to one or more secondary computing devices 106.

At step 645, a computing system may generate, in the one or more secondary computing devices, based on inputting the second sequence number into the identical copy of the one or more distributed machine learning models in each of the one or more secondary computing devices, one or more copies of the second version of the training data. The identical copy of the one or more distributed machine learning models may use the second sequence number to generate the one or more copies of the second version of the training data by modifying the first version of the training data. For example, the one or more secondary computing devices 106 may use the second sequence number and the first version of the training data to modify the first version of the training data and thereby generate the second version of the training data.

Figure 7:
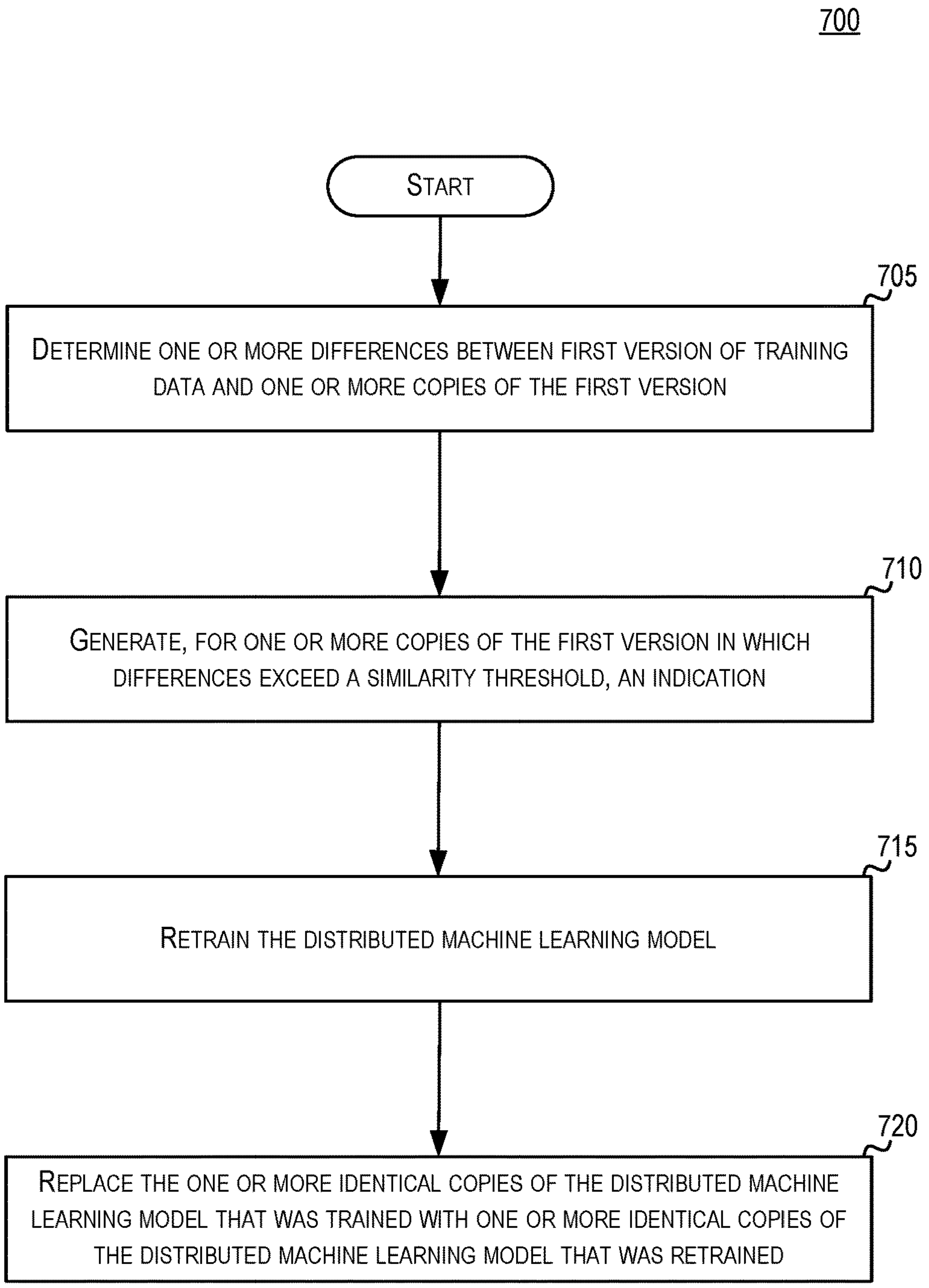
FIG. 7 depicts an illustrative method for automatically detecting differences in copies of training data in accordance with one or more aspects of the disclosure.

FIG. 7 depicts an illustrative method for automatically detecting differences in copies of training data in accordance with one or more aspects of the disclosure. The steps of a method 700 for automatically training a machine learning model to automatically generate and/or replicate different versions of training data may be implemented by a computing device or computing system (e.g., the data replication computing platform 102) in accordance with the computing devices and/or computing systems described herein. One or more of the steps described with respect to FIG. 7 may be omitted, performed in a different order, and/or modified. Further, one or more other steps (e.g., the steps described with respect to FIGS. 6 and/or 8) may be added to the steps described with respect to FIG. 7.

At step 705, a computing system may determine one or more differences between a version of the training data (e.g., a second version of the training data) and one or more copies of the same version of the training data (e.g., a second version of the training data). For example, the data replication computing platform 102 may analyze a second version of training data and compare the second version to copies of the second version of the training data. The comparison may be used to determine the one or more differences between the second version of the training data and the one or more copies of the second version of the training data. The one or more differences may comprise a difference between a size of the second version and a size of the one or more copies of the second version (e.g., a size difference in bytes), a difference between types of datapoints in the second version and the types of the datapoints in the one or more copies of the second version (e.g., a first version of the training data may comprise a plurality of fields and corresponding values for numeric data, text data, and images, and a copy of the first version of the training data may comprise fields and corresponding values for numeric data, text data, and no fields or values for images), and/or a difference in a number of the datapoints in the second version and the number of the datapoints in the one or more copies of the second version.

Determining the one or more differences between the second version of training data and one or more copies of the second version of the training data may comprise generating a primary hash value based on the second version of the training data. For example, the data replication computing platform 102 may input samples of the second version of the training data into a hash function that is configured to generate the primary hash value.

Further, determining the one or more differences between the second version of training data and one or more copies of the second version of the training data may comprise generating one or more secondary hash values based on the one or more copies of the second version of the training data. For example, the data replication computing platform 102 may input samples of the one or more copies of the second version of the training data into a hash function that is configured to generate the one or more secondary hash values. Determining the one or more differences between the second version of training data and one or more copies of the second version of the training data may comprise determining whether the one or more secondary hash values match the primary hash value. For example, the data replication computing platform 102 may compare the primary hash value to the one or more secondary hash values in order to determine if the one or more secondary hash values match the primary hash value.

Determining the one or more differences between the second version of training data and one or more copies of the second version of the training data may comprise generating, for each of the one or more copies of the second version of the training data that correspond to the one or more secondary hash values that do not match the primary hash value, an indication that the one or more copies of the second version of the training data are inaccurate. For example, if the secondary hash value of one of the one or more copies of the second version of the training data does not match the primary hash value, an indication that the copy of the second version of the training data is inaccurate may be generated and/or sent to the secondary computing device that generated the copy of the second version of the training data.

At step 710, a computing system may generate, for one or more copies of a second version of training data in which one or more differences exceed a similarity threshold, an indication that the one or more copies of the second version of the training data are inaccurate. For example, the data replication computing platform 102 may determine the one or more secondary computing devices that correspond to the one or more copies of the second version of the training data in which the one or more differences exceeded the similarity threshold. The data replication computing platform 102 may then send to the one or more secondary computing devices a message comprising an indication that the copy of the second version of the training data is inaccurate.

At step 715, a computing system may retrain one or more distributed machine learning models. Retraining the one or more distributed machine learning models may comprise using the same training data used to train the one or more distributed machine learning models initially or using different training data. For example, the data replication computing platform 102 may retrain the one or more distributed machine learning models using new training data that may be larger (e.g., comprise a greater number of fields and/or values) than the training data that was initially used to train the one or more distributed machine learning models. By way of further example, the data replication computing platform 102 may retrain the one or more distributed machine learning models using the training data described in step 605 of the method 600.

At step 720, a computing system may replace one or more identical copies of the distributed machine learning model that was previously trained with one or more identical copies of the distributed machine learning model that was retrained. For example, the data replication computing platform 102 may send one or more identical copies of the distributed machine learning model that was retrained to the one or more secondary computing devices 106. Further, the data replication computing platform 102 may send a replacement command to the one or more secondary computing devices 106. The replacement command may indicate that the one or more secondary computing devices may replace the one or more identical copies of the distributed machine learning model that was previously trained (e.g., the distributed machine learning model that was previously trained in step 610 of the method 600) with one or more identical copies of the distributed machine learning model that was retrained (e.g., the distributed machine learning model that was retrained in step 715 of the method 700).

Figure 8:
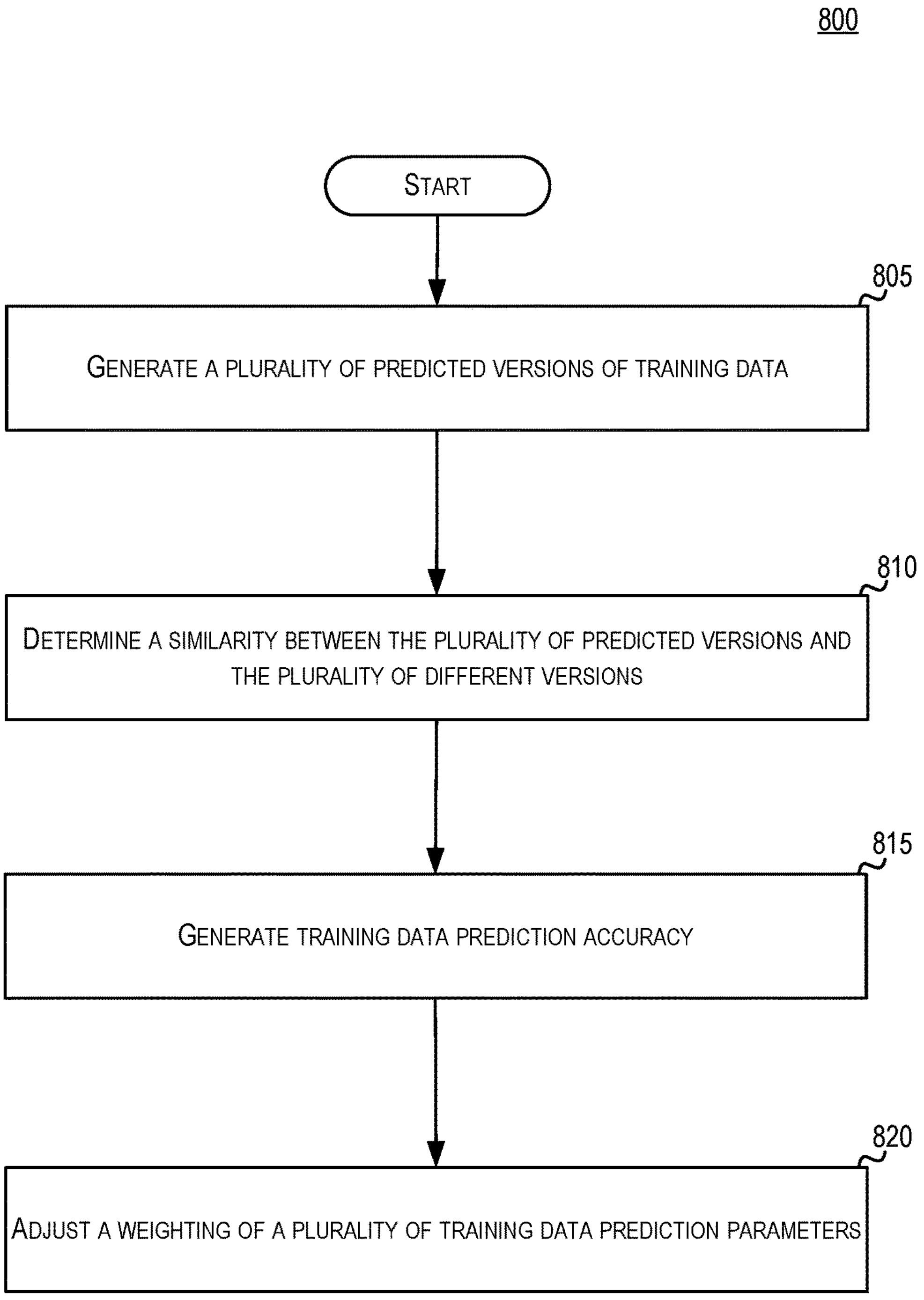
FIG. 8 depicts an illustrative method for automatically training a machine learning model to generate and replicate distributed training data in accordance with one or more aspects of the disclosure.

FIG. 8 depicts an illustrative method for automatically training a machine learning model to generate and replicate distributed training data in accordance with one or more aspects of the disclosure. The steps of a method 800 for automatically training a machine learning model to automatically generate different versions of training data may be implemented by a computing device or computing system (e.g., the data replication computing platform 102) in accordance with the computing devices and/or computing systems described herein. One or more of the steps described with respect to FIG. 8 may be omitted, performed in a different order, and/or modified. Further, one or more other steps (e.g., the steps described with respect to FIGS. 6 and 7) may be added to the steps described with respect to FIG. 8.

At step 805, a computing system may generate a plurality of predicted versions of training data. Generating the plurality of predicted versions of training data may be based on inputting a plurality of different sequence numbers data into one or more distributed machine learning models (e.g., the one or more distributed machine learning models described herein). The one or more distributed machine learning models may comprise the features and/or capabilities of machine learning models described herein including the one or more machine learning models 218 described with respect to FIG. 2 and/or the artificial neural network 300 described with respect to FIG. 3. For example, training data may be inputted into one or more distributed machine learning models that are implemented on the machine learning model training system 108.

The one or more distributed machine learning models of the machine learning model training system 108 may be configured and/or trained to receive the plurality of different sequence numbers and perform one or more operations including analyzing the training data and determining how to modify the training data based on the different sequence number. Further, the one or more distributed machine learning models may generate a plurality of predicted versions of training data.

At step 810, a computing system may determine similarities between the plurality of predicted versions of training data and a plurality of different versions of training data (e.g., the plurality of different versions of the training data generated by the data generation machine learning model described in step 605 of the method 600). The plurality of predicted versions of training data may comprise different combinations of values that may match corresponding values (e.g., values in the same field) as values in the plurality of different versions of the training data. Determination of the similarities between the plurality of predicted versions of training data and the plurality of different versions of training data may be based on one or more matches of fields and/or values of the plurality of different versions of training data.

The plurality of predicted versions of the training data may comprise a plurality of predicted images. The similarity between the plurality of predicted versions of the training data and the plurality of different versions of the training data may be based on a number of visual features of the plurality of images that match the visual features of the plurality of predicted images. For example, the data replication computing platform 102 may analyze the plurality of predicted images and the plurality of images in the plurality of different versions to determine the similarity based on similarities in spatial relations of visual features in the plurality of predicted images and spatial relations of the plurality of images.

The plurality of predicted versions of the training data may comprise a plurality of predicted text segments. The similarity between the plurality of predicted versions of the training data and the plurality of different versions of the training data is based on a number of the plurality of text segments that match the plurality of predicted text segments. For example, the data replication computing platform 102 may analyze the plurality of predicted text segments and the plurality of text segments in the plurality of different versions to determine the similarity based on similarities in words and/or semantic structure in the plurality of predicted text segments and words and/or semantic structure of the plurality of text segments.

The plurality of predicted versions of the training data may comprise a plurality of predicted numerical datapoints. The similarity between the plurality of predicted versions of the training data and the plurality of different versions of the training data is based on a number of the plurality of numerical datapoints that match the plurality of predicted numerical datapoints. For example, the data replication computing platform 102 may analyze the plurality of predicted numerical datapoints and the plurality of numerical datapoints in the plurality of different versions to determine the similarity based on similarities in the values and/or types (e.g., dollars, percentages, floating point numbers, and/or integers) in the plurality of predicted numerical datapoints and the values and/or types of the plurality of numerical datapoints.

At step 815, a computing system may generate, based on the similarity between the plurality of predicted versions of training data and the plurality of different version of the training data, a training data prediction accuracy of the one or more distributed machine learning models. Generation of the training data prediction accuracy may be based on an extent to which the plurality of predicted versions of training data are similar to the plurality of different versions of the training data.

For example, if the plurality of predicted versions of training data and the plurality of different version of the training data are similar (e.g., the compositions of the plurality of predicted versions of training data match the plurality of different version of the training data or are within a threshold range of similarity) then the similarity may be determined to be high. If the plurality of predicted versions of training data are dissimilar (e.g., the compositions of the plurality of predicted versions of training data do not match the plurality of different version of the training data or are outside a threshold range of similarity) to the plurality of different version of the training data, the similarity may be determined to be low. The training data prediction accuracy may be positively correlated with the similarity between the plurality of predicted versions of training data and the plurality of training different versions of training data. Further, the training data prediction accuracy may be based on an amount of similarities comprising an amount of the plurality of predicted versions of training data that have the same composition as the plurality of different version of the training data.

At step 820, a computing system may adjust a weighting of a plurality of predicted training data parameters of the one or more distributed machine learning models based on the predicted training data accuracy. For example, the machine learning model training system 108 may increase the weight of the plurality of predicted training data parameters that were determined to increase the predicted training data accuracy and/or decrease the weight of the plurality of predicted training data parameters that were determined to decrease the predicted training data accuracy. Further, some of the plurality of predicted training data parameters may be more heavily weighted than other predicted training data parameters. The weighting of the plurality of predicted training data parameters may be positively correlated with the extent to which the plurality of predicted training data parameters contribute to increasing the predicted training data accuracy. For example, predicted training data error rate parameters may be weighted more heavily than predicted training data throughput parameters.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air and/or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for generating and replicating distributed training data, the computing system comprising:

one or more processors;

a data generation machine learning model configured to generate a plurality of different versions of training data and a corresponding plurality of different sequence numbers;

a distributed machine learning model configured to generate the plurality of different versions of the training data based on the corresponding plurality of different sequence numbers;

one or more one or more secondary computing devices, wherein each of the one or more secondary computing devices is configured to store an identical copy of the distributed machine learning model; and memory storing computer-readable instructions that, when executed by the one or more processors, cause the computing system to:

generate, based on inputting the training data into the data generation machine learning model, the plurality of different versions of the training data and the corresponding plurality of different sequence numbers;

train, based on inputting the training data and the plurality of different versions of the training data into the distributed machine learning model, the distributed machine learning model to generate each of the plurality of different versions of the training data based on input of each of the corresponding plurality of different sequence numbers;

determine an estimated time to send a first version of the plurality of different versions of the training data to the one or more secondary computing devices;

based on the estimated time meeting one or more criteria, send the first version of the training data and one or more identical copies of the distributed machine learning model to the one or more secondary computing devices;

determine a second sequence number corresponding to a second version of the plurality of different versions of the training data;

send the second sequence number to the one or more secondary computing devices; and generate, in the one or more secondary computing devices, based on inputting the second sequence number into the identical copy of the distributed machine learning model in each of the one or more secondary computing devices, one or more copies of the second version of the plurality of different versions of the training data.

2. The computing system of claim 1, wherein the memory stores computer-readable instructions that, when executed by the one or more processors, cause the computing system to:

determine one or more differences between the second version of the training data and the one or more copies of the second version of the training data; and generate, for the one or more copies of the second version of the training data in which the one or more differences exceed a similarity threshold, an indication that the one or more copies of the second version of the training data are inaccurate.

3. The computing system of claim 2, wherein the memory stores computer-readable instructions that, when executed by the one or more processors, cause the computing system to:

retrain the distributed machine learning model; and replace the one or more identical copies of the distributed machine learning model that was previously trained with one or more identical copies of the distributed machine learning model that was retrained.

4. The computing system of claim 2, wherein the one or more differences comprise a difference between a size of the second version and a size of the one or more copies of the second version, a difference between types of datapoints in the second version and the types of the datapoints in the one or more copies of the second version, or a difference in a number of the datapoints in the second version and the number of the datapoints in the one or more copies of the second version.

5. The computing system of claim 2, wherein the memory stores computer-readable instructions to determine the one or more differences between the second version of the training data and the one or more copies of the second version of the training data that, when executed by the one or more processors, cause the computing system to:

generate a primary hash value based on the second version of the training data;

generate one or more secondary hash values based on the one or more copies of the second version of the training data;

determine whether the one or more secondary hash values match the primary hash value; and generate, for each of the one or more copies of the second version of the training data that correspond to the one or more secondary hash values that do not match the primary hash value, an indication that the one or more copies of the second version of the training data are inaccurate.

6. The computing system of claim 1, wherein the memory stores computer-readable instructions to train the distributed machine learning model, that when executed by the one or more processors, cause the computing system to:

generate, based on inputting the plurality of different sequence numbers into the distributed machine learning model, a plurality of predicted versions of the training data;

determine a similarity between the plurality of predicted versions of the training data and the plurality of different versions of the training data;

generate, based on the similarity between the plurality of predicted versions of the training data and the plurality of different versions of the training data, a training data prediction accuracy of the distributed machine learning model; and adjust a weighting of one or more training data prediction parameters of the distributed machine learning model based on the training data prediction accuracy, wherein the weighting of the training data prediction parameters that increase the training data prediction accuracy are increased, and wherein the weighting of the training data prediction parameters that decrease the training data prediction accuracy are decreased.

7. The computing system of claim 6, wherein the plurality of different versions of the training data comprises a plurality of images, a plurality of text segments, or a plurality of numerical datapoints.

8. The computing system of claim 7, wherein the plurality of predicted versions of the training data comprises a plurality of predicted images, and wherein the similarity between the plurality of predicted versions of the training data and the plurality of different versions of the training data is based on a number of visual features of the plurality of images that match the visual features of the plurality of predicted images.

9. The computing system of claim 7, wherein the plurality of predicted versions of the training data comprises a plurality of predicted text segments, and wherein the similarity between the plurality of predicted versions of the training data and the plurality of different versions of the training data is based on a number of the plurality of text segments that match the plurality of predicted text segments.

10. The computing system of claim 7, wherein the plurality of predicted versions of the training data comprises a plurality of predicted numerical datapoints, and wherein the similarity between the plurality of predicted versions of the training data and the plurality of different versions of the training data is based on a number of the plurality of numerical datapoints that match the plurality of predicted numerical datapoints.

11. The computing system of claim 1, wherein the corresponding plurality of sequence numbers have a length of one byte.

12. The computing system of claim 1, wherein the one or more secondary computing devices are physically remote from the computing device that generates the first version of the training data.

13. The computing system of claim 1, wherein the meeting the one or more criteria comprises the estimated time to send the first version of the training data to the one or more secondary computing devices exceeding a time for the one or more secondary computing devices to generate the first version of the training data.

14. The computing system of claim 1, wherein the distributed machine learning model comprises a generative adversarial network (GAN).

15. A method of generating and replicating distributed training data, the method comprising:

generating, by a computing device comprising one or more processors, based on inputting training data into a data generation machine learning model, a plurality of different versions of the training data and a corresponding plurality of different sequence numbers;

training, by the computing device, based on inputting the training data and the plurality of different versions of the training data into a distributed machine learning model, the distributed machine learning model to generate each of the plurality of different versions of the training data based on input of each of the corresponding plurality of different sequence numbers;

determining, by the computing device, an estimated time to send a first version of the plurality of different versions of the training data to the one or more secondary computing devices;

based on the estimated time meeting one or more criteria, sending, by the computing device, the first version of the training data and one or more identical copies of the distributed machine learning model to the one or more secondary computing devices;

determining, by the computing device, a second sequence number corresponding to a second version of the plurality of different versions of the training data;

sending, by the computing device, the second sequence number to the one or more secondary computing devices; and generating, in the one or more secondary computing devices, based on inputting the second sequence number into the identical copy of the distributed machine learning model in each of the one or more secondary computing devices, one or more copies of the second version of the plurality of different versions of the training data.

16. The method of claim 15, further comprising:

determining, by the computing device, one or more differences between the second version of the training data and the one or more copies of the second version of the training data; and generating, by the computing device, for the one or more copies of the second version of the training data in which the one or more differences exceed a similarity threshold, an indication that the one or more copies of the second version of the training data are inaccurate.

17. The method of claim 16, wherein the one or more differences comprise a difference between a size of the second version and a size of the one or more copies of the second version, a difference between types of datapoints in the second version and the types of the datapoints in the one or more copies of the second version, or a difference in a number of the datapoints in the second version and the number of the datapoints in the one or more copies of the second version.

18. The method of claim 16, further comprising:

retraining, by the computing device, the distributed machine learning model; and replacing, by the computing device, the one or more identical copies of the distributed machine learning model that were previously trained with one or more identical copies of the distributed machine learning model that were retrained.

19. The method of claim 15, wherein the distributed machine learning model comprises a generative adversarial network (GAN).

20. One or more non-transitory computer-readable comprising instructions that, when executed by a computing platform comprising at least one processor, a communication interface, and memory, cause the computing platform to:

generate, based on inputting training data into a data generation machine learning model, a plurality of different versions of the training data and a corresponding plurality of different sequence numbers;

train, based on inputting the training data and the plurality of different versions of the training data into a distributed machine learning model, the distributed machine learning model to generate each of the plurality of different versions of the training data based on input of each of the corresponding plurality of different sequence numbers;

determine an estimated time to send a first version of the plurality of different versions of the training data to the one or more secondary computing devices;

based on the estimated time meeting one or more criteria, send the first version of the training data and one or more identical copies of the distributed machine learning model to the one or more secondary computing devices;

determine a second sequence number corresponding to a second version of the plurality of different versions of the training data;

send the second sequence number to the one or more secondary computing devices; and generate, in the one or more secondary computing devices, based on inputting the second sequence number into the identical copy of the distributed machine learning model in each of the one or more secondary computing devices, one or more copies of the second version of the plurality of different versions of the training data.

* * * * *